F. BURCHARTZ.
HOLLOW BUILDING BLOCK.
APPLICATION FILED JUNE 27, 1910.
983,534.
Patented Feb. 7, 1911.
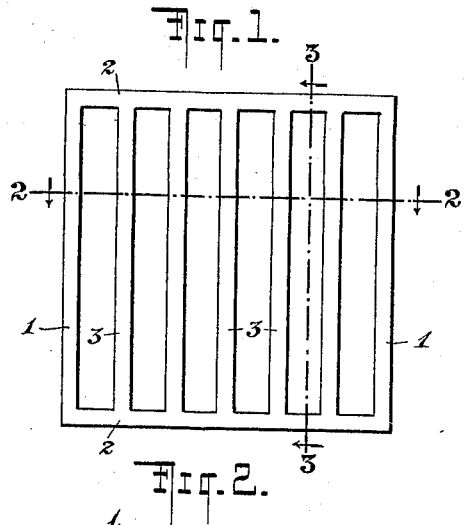
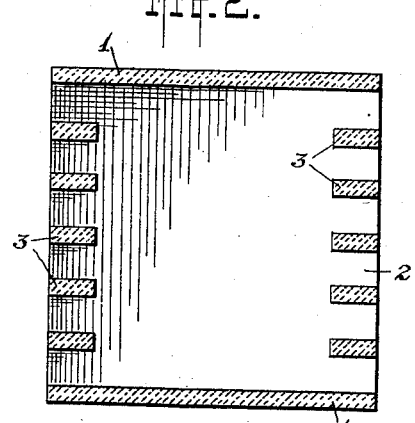
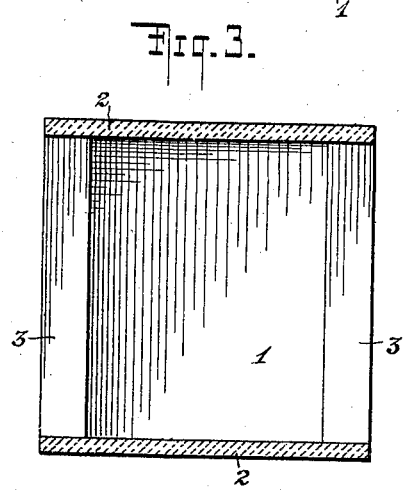
WITNESSES:
INVENTOR
Ferdinand Burchartz
BY
ATTORNEYS

UNITED STATES PATENT OFFICE.

FERDINAND BURCHARTZ, OF NEW YORK, N. Y.

HOLLOW BUILDING-BLOCK.

983,534. Specification of Letters Patent. Patented Feb. 7, 1911.

Original application filed January 21, 1910, Serial No. 539,279. Divided and this application filed June 27, 1910. Serial No. 568,965.

*To all whom it may concern:*

Be it known that I, FERDINAND BURCHARTZ, a citizen of the United States, and resident of the borough of Manhattan, city, county, and State of New York, have invented certain new and useful Improvements in Hollow Building-Blocks, of which the following is a specification.

My invention relates to hollow building blocks and has for its object to produce a block of this description, having spaced parallel partitions extending across the usual open ends, the space between which may be closed or filled with mortar or similar material to form a complete cubical hollow block.

Other advantages of my improved construction will appear from the description hereinafter and the features of novelty will be pointed out in the appended claim.

This application is a division of one filed by me in the United States Patent Office on January 21, 1910, Serial No. 539,279, which original application shows a machine or apparatus for the manufacture of a block of the kind forming the subject matter of the present application.

Reference is to be had to the accompanying drawings in which—

Figure 1 is a front elevation of my improved block; Fig. 2 is a sectional view thereof on the line 2—2 of Fig. 1; and Fig. 3 is a sectional view on the line 3—3 of Fig. 1.

The block comprises parallel side walls 1 and parallel top and bottom walls 2, forming an open-ended tubular construction. Spaced parallel ribs or partitions 3 extend across the open ends of said block from one wall 2 to the other to form foraminated end walls, as clearly shown in Fig. 1. These ribs or partitions preferably extend only a short distance into said tubular block, although if desired one or more of said partitions may extend a considerable distance into the block for strengthening purposes. The spaces between adjacent ribs or partitions, after the block has been formed, may be filled with mortar or similar material so as to form a complete hollow cubical block. The ribs and walls of the block in this case form supports for the mortar or similar material which unites therewith to form substantially solid end walls. The partitions being formed integral with the block itself also serve as strengthening means to brace the block and particularly the ends thereof against transverse strains.

A block constructed according to my invention is extremely light and strong and capable of withstanding great strain and is quickly and cheaply manufactured in large quantities, of any desired dimensions. My improved block is also fire proof and has all the advantages of a molded block and is produced for instance by means of an apparatus shown and described in the application of which this is a division, with much less cost and labor than such molded blocks.

Changes in the specific construction shown and described may be made within the scope of the claim without departing from the spirit of my invention.

I claim as my invention:

A building block comprising a hollow body portion having solid side walls and open opposite ends, and a series of spaced ribs extending transversely across each open end and integral with said body portion, said series being separated from each other in the direction of the axis of the block.

In testimony whereof I have hereunto set my hand in the presence of two subscribing witnesses.

FERDINAND BURCHARTZ.

Witnesses:
JOHN A. KEHLENBECK,
WILLIAM SCHMIDT.